United States Patent [19]

Nadin

[11] Patent Number: 5,015,013

[45] Date of Patent: May 14, 1991

[54] CONNECTOR FITTING FOR CONNECTING CORRUGATED CONDUIT SECTIONS

[75] Inventor: Léonard Nadin, L'Union, France

[73] Assignee: Labinal S. A., Montigny Le Bretonneux, France

[21] Appl. No.: 466,479

[22] Filed: Jan. 17, 1990

[30] Foreign Application Priority Data

Feb. 8, 1989 [FR] France ................. 89 01607

[51] Int. Cl.⁵ ............................................. F16L 3/00
[52] U.S. Cl. ..................................... 285/64; 285/419; 285/903; 285/921
[58] Field of Search ............. 285/419, 373, 903, 64, 285/137.1, 921; 248/71, 74.2, 74.3

[56] References Cited

U.S. PATENT DOCUMENTS

| | | | |
|---|---|---|---|
| 3,727,953 | 4/1973 | Martin et al. ................. | 285/903 X |
| 4,443,031 | 4/1984 | Borsh et al. ................. | 285/419 |
| 4,478,381 | 10/1984 | Pittion et al. ................ | 248/71 |
| 4,795,197 | 1/1989 | Kaminski et al. ............. | 285/419 X |

Primary Examiner—Dave W. Arola
Assistant Examiner—Heather Chun
Attorney, Agent, or Firm—Sandler, Greenblum & Bernstein

[57] ABSTRACT

A connector fitting for a corrugated conduit comprises complementary first and second parts together defining a cylindrical body. They are molded in one piece with a strip which links the first and second parts together in the manner of a hinge. There is at least one rib on each part disposed in a plane perpendicular to the longitudinal axis of the part. At the free end of the first part opposite that adjoining the hinge is a first locking member. There is a complementary second locking member at the free end of the second part opposite that adjoining the hinge. A third locking member is provided on one edge of the first part adjoining the hinge and a complementary fourth locking member on an edge of the second part adjoining the hinge. The first locking member comprises a first bar and an outwardly facing first hook at the end of the first bar. The third locking member comprises a second bar and an outwardly facing second hook at the end of the second bar. The second part comprises two openings in corresponding edges adapted to receive the first and second bars and having flats at their outer edges adapted to cooperate with the first and second hooks.

5 Claims, 5 Drawing Sheets

CONNECTOR FITTING FOR CONNECTING CORRUGATED CONDUIT SECTIONS

BACKGROUND OF THE INVENTION

1. Field of the Invention

The present invention concerns connector fittings (hereinafter called closure rings) for use with corrugated conduits.

2. Description of the Invention

Corrugated plastic conduits formed with a longitudinal slit are used to protect electrical conductors. Conduits of this kind are highly practical because they avoid the need to insert conductors from one end of the conduit and sliding them along it. Also, these conduits can receive conductors with components attached to their ends, such as electrical connectors, which would not pass through the conduit.

To prevent the conduit from opening along the slit if is curved or deformed, plastic rings are attached to the conduit at various intervals. The plastic rings are comprised of a circular arc shaped part provided at one end with a locking member and at the other end with a hinge member to which is articulated a complementary second circular arc shaped part comprised of a free end which is provided with a locking member complementary to the member on the first part. The internal surface of the ring is comprised of at least one rib adapted to cooperate with a groove formed between the corrugations on the conduit. These rings are usually molded in one piece from a plastic material, the hinge comprising a plastic strip joining the two circular arc shaped parts.

A disadvantage of these rings is that the strip forming the hinge must necessarily be thin and therefore mechanically weak so that they often break, the result being that the ring does not remain attached to the conduit.

It has been proposed to provide means for locking the parts adjoining the hinge when the ring is closed, but these proposals have proved to be too complex and impractical to mold.

There is also known in the prior art (see U.S. Pat. No. 4,443,031) a ring molded in one piece from a plastic material, having two complementary portions defining between them a cylindrical body joined by a strip forming a hinge, one portion comprising at its free end a first bar with an inwardly facing hook and the second portion with a hook facing the same way as the first hook, with openings being provided in each portion to receive the corresponding hook.

An arrangement of this kind has various disadvantages. The hinge is necessarily wide so that the second hook can be inserted into the corresponding opening in the first portion, with the result being that when the ring is closed the hinge forms a bead and the fitting cannot be used in particularly small or narrow places.

Also, the interior surface of the ring comprises ribs for cooperating with the corrugations on the conduit and if traction is applied to the conduit there is a tendency for the hooks to separate from the openings.

An object of the present invention is to remedy these disadvantages.

SUMMARY OF THE INVENTION

The present invention consists of a connector fitting for corrugated conduits, comprising complementary first and second parts together defining a cylindrical body and molded in one piece with a strip which links the first and second parts together in the manner of a hinge, at least one rib on each part disposed in a plane perpendicular to the longitudinal axis of the part, a first locking member at the free end of the first part opposite that adjoining the hinge, a complementary second locking member at the free end of the second part opposite that adjoining the hinge, a third locking member on an edge of the first part adjoining the hinge, and a complementary fourth locking member on an edge of the second part adjoining the hinge, wherein the first locking member comprises a first bar and an outwardly facing first hook at the end of the first bar, the third locking member comprises a second bar and an outwardly facing hook at the end of the second bar and the second part comprises two openings in corresponding edges adapted to receive the first and second bars and having flats at their outer edges adapted to cooperate with the first and second hooks.

This kind of arrangement is highly advantageous because it is simple to implement and does not require the manufacture of a complex mold. Also, it makes it possible to fix two rings to each other with one of them upside down, so that two corrugated conduits can be secured side-by-side, for example.

Finally, as the openings are formed in the thickness of the second part, the ring is compact with no excess thickness on its lateral surface.

In one embodiment one part is provided on its external surface with a lug comprising means for fixing it into a hole in the wall.

Thus the conduit, or two conduits side-by-side, can be fixed to a wall.

The inside diameter at one end of the ring may be larger than the inside diameter at the other end, so that conduits with different diameters can be butt-joined.

In one embodiment, one of the parts comprises means for fixing it to a male member.

One of the parts is preferably provided with a slideway for receiving a corresponding male member and incorporating a stop member.

In another embodiment of the invention one of the parts is provided with a cut-out for electrical conductors to pass through.

The cut-out is preferably formed on the free edge of one of the parts to facilitate the insertion of conductors into the cutout.

The invention will now be described in more detail and by way of example only with reference to specific embodiments shown in the appended drawings.

DETAILED DESCRIPTION OF THE INVENTION

Figure 1:
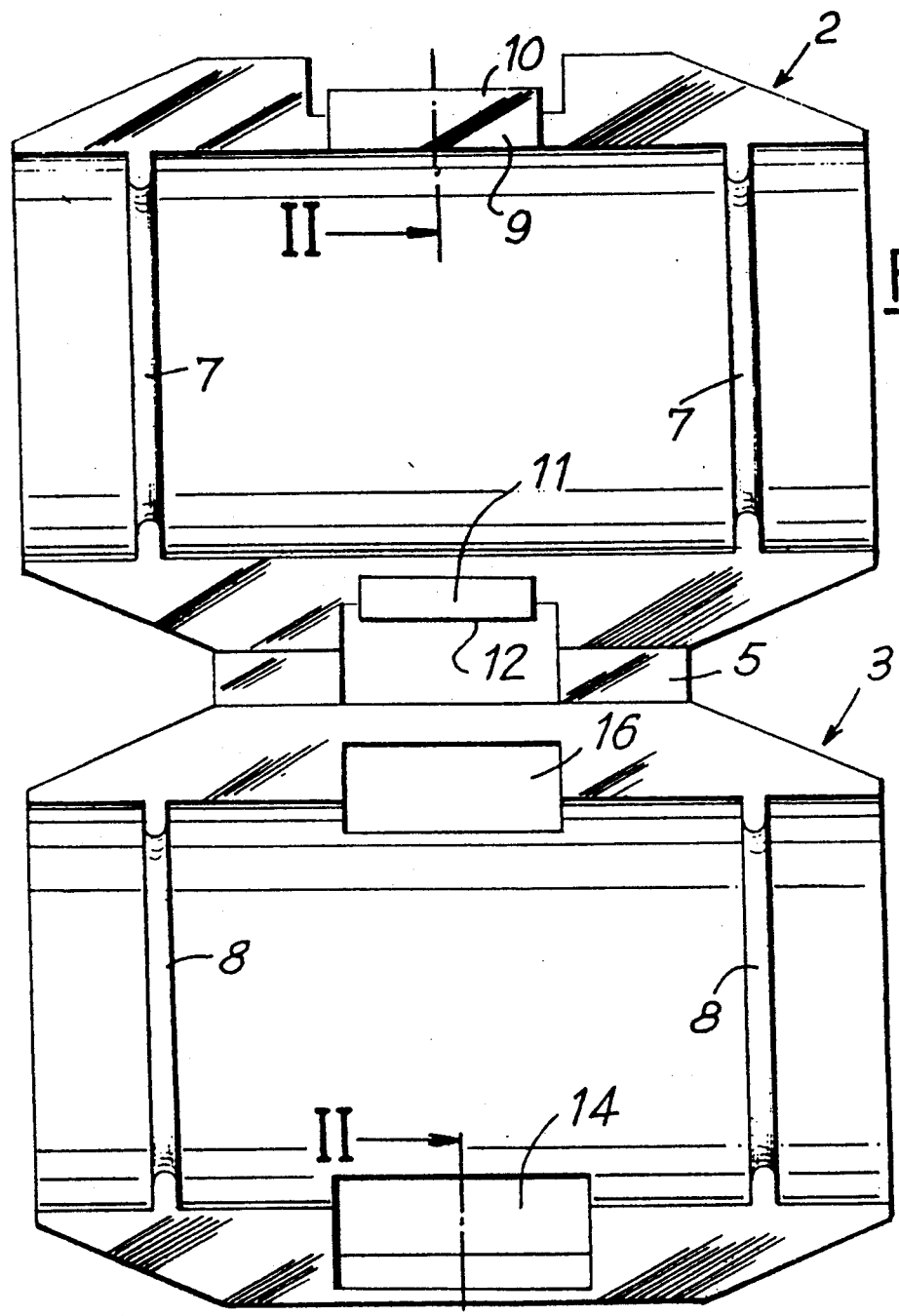
FIG. 1 is a plan view of a closure ring in accordance with the invention.
Figure 2:
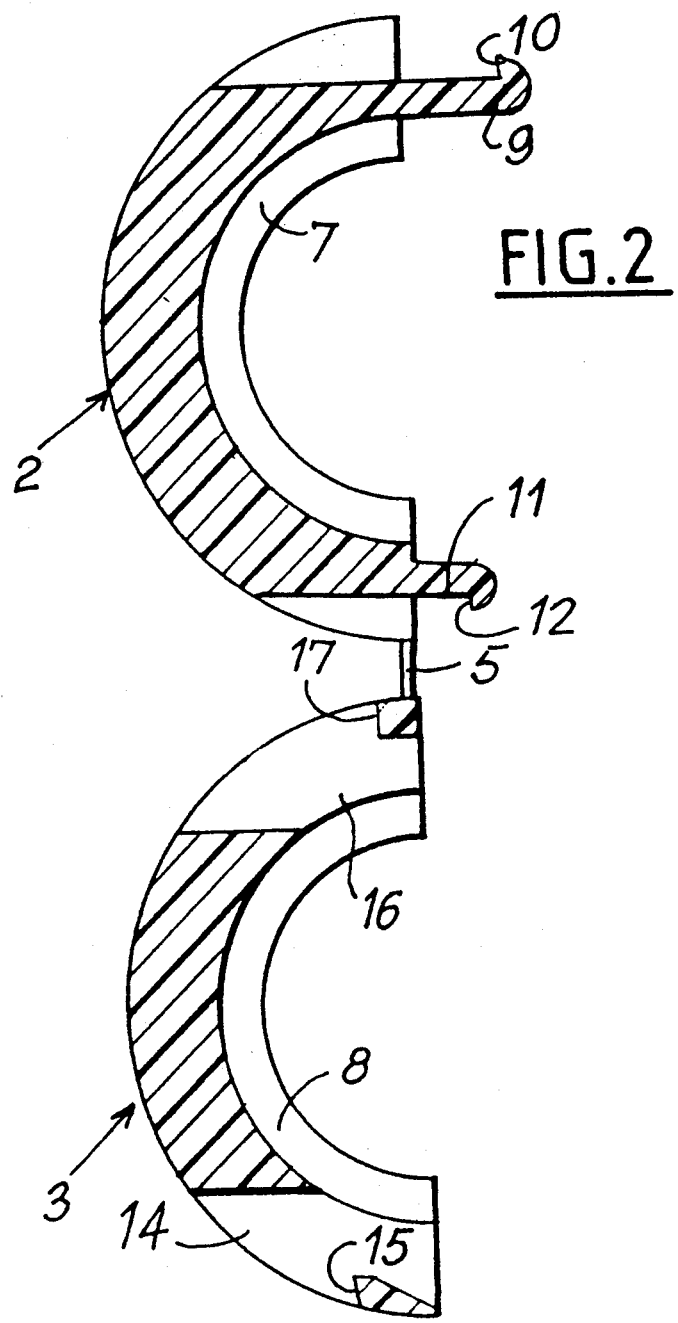
FIG. 2 is a view in cross-section on the line II—II in FIG. 1.
Figure 3:
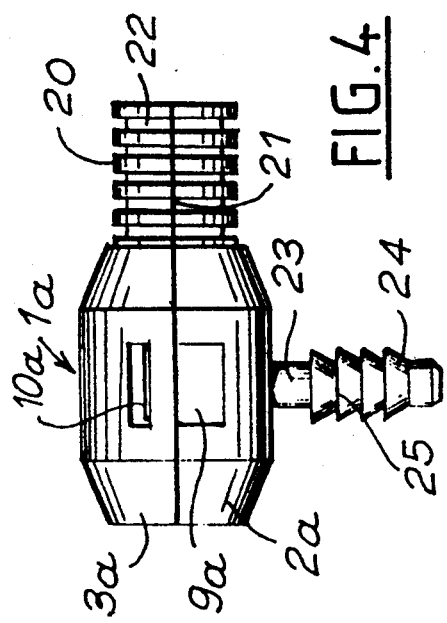
FIG. 3 is an elevated view of an assembled closure ring.

The various figures show a closure ring 1 comprising two parts 2 and 3.

Parts 2 and 3 are molded in one piece from plastic with a thin strip 5 constituting a hinge.

Parts 2 and 3 are in the shape of a 180° circular arc.

Part 2 has on its inside surface two ribs 7 disposed in parallel planes that are perpendicular to the longitudinal axis, part 3 comprising corresponding ribs 8.

In the middle part of the end of part 2 opposite that adjoining the hinge 5 is a bar 9 terminating at an outwardly facing hook 10 and designed to cooperate with an opening 14 provided in the corresponding free end of the part 3, one edge of said opening 14 incorporating a flat part 15 against hook 10. The members 9, 10, 14 and 15 thus constitute members for locking the two parts together.

In the middle part of the edge of part 2 adjacent the hinge 5 is a bar 11 provided at its free edge with an outwardly facing hook 12. Part 3 incorporates on its corresponding edge an opening 16, one edge of which has a flat part 17.

When the closure ring 1 is closed, the bar 9 and the hook 10 respectively cooperate with the opening 14 and the flat 15 to lock together the ends of the parts 2 and 3 opposite those adjoining the hinge 5. The ends of said parts 2 and 3 adjoining the hinge 5 are also locked by the bar 11 and its hook 12 which respectively cooperate with the opening 16 and the flat 17.

The closure ring in accordance with the invention is designed for use with conduit 20 incorporating a longitudinal slit 21.

Conduits of this kind comprise a series of rings separated by grooves 22.

The ribs 7 and the corresponding ribs 8 are separated by a distance which corresponds to the pitch of the grooves 22. When the ring is mounted on the conduit, said ribs are inserted into the corresponding grooves 22.

The ring 1 may be used near the ends of a conduit to prevent it from opening along the slit 21.

The closure ring in accordance with the invention can also be used to butt-join two conduits 20.

Figure 4:
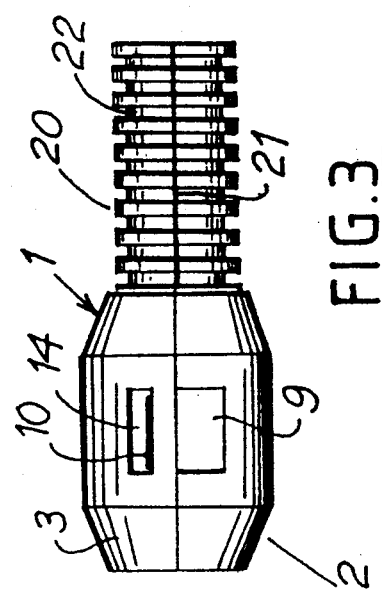
FIG. 4 is an elevated view of an alternate closure ring in accordance with the invention.

FIG. 4 shows an alternative embodiment of the invention. This figure uses the same reference numbers as the previous figures to designate corresponding parts, but with the suffix "a".

In this embodiment the closure ring 1a is designed to prevent an unwanted opening of the conduit 20 and also to fix the conduit to a wall. To this end the part 2a comprises a lug 23 with a pointed end 24 and a series of shoulders 25.

The lug 23 is designed to be inserted into a hole in a metal plate, for example, by virtue of elastic deformation of the shoulders 25 which constitute stop members preventing the closure ring from becoming inadvertently detached from the hole into which it is fixed by the lug 23.

A closure ring of this kind can also be used to butt-join two conduits 20.

The closure ring in accordance with the invention has the additional advantage of being fixable to a second, identical closure ring to prevent unwanted opening of the slit 21 of two conduits 20 and also to hold the latter side-by-side. One of the rings may be of the type for the conduit 1a (see FIG. 4) if the conduit must be attached to a wall.

Figure 6:
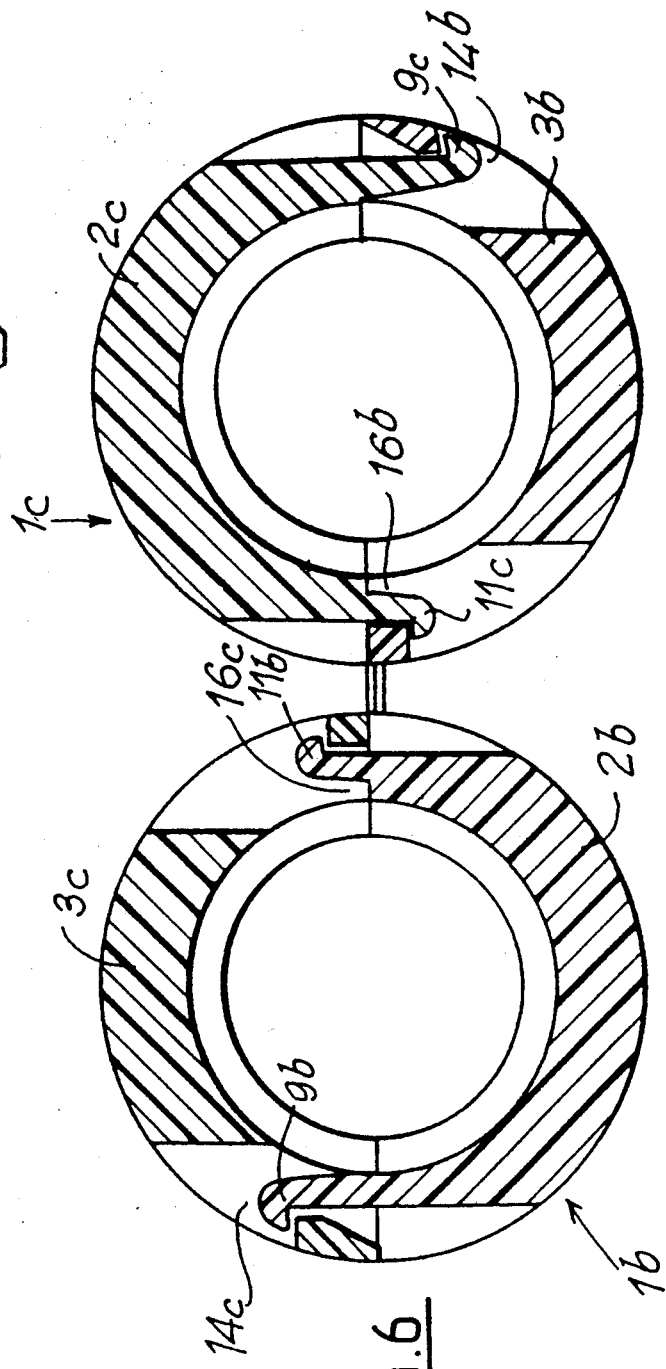
FIG. 6 is a view in cross-section showing the two closure rings fitted together.
Figure 5:
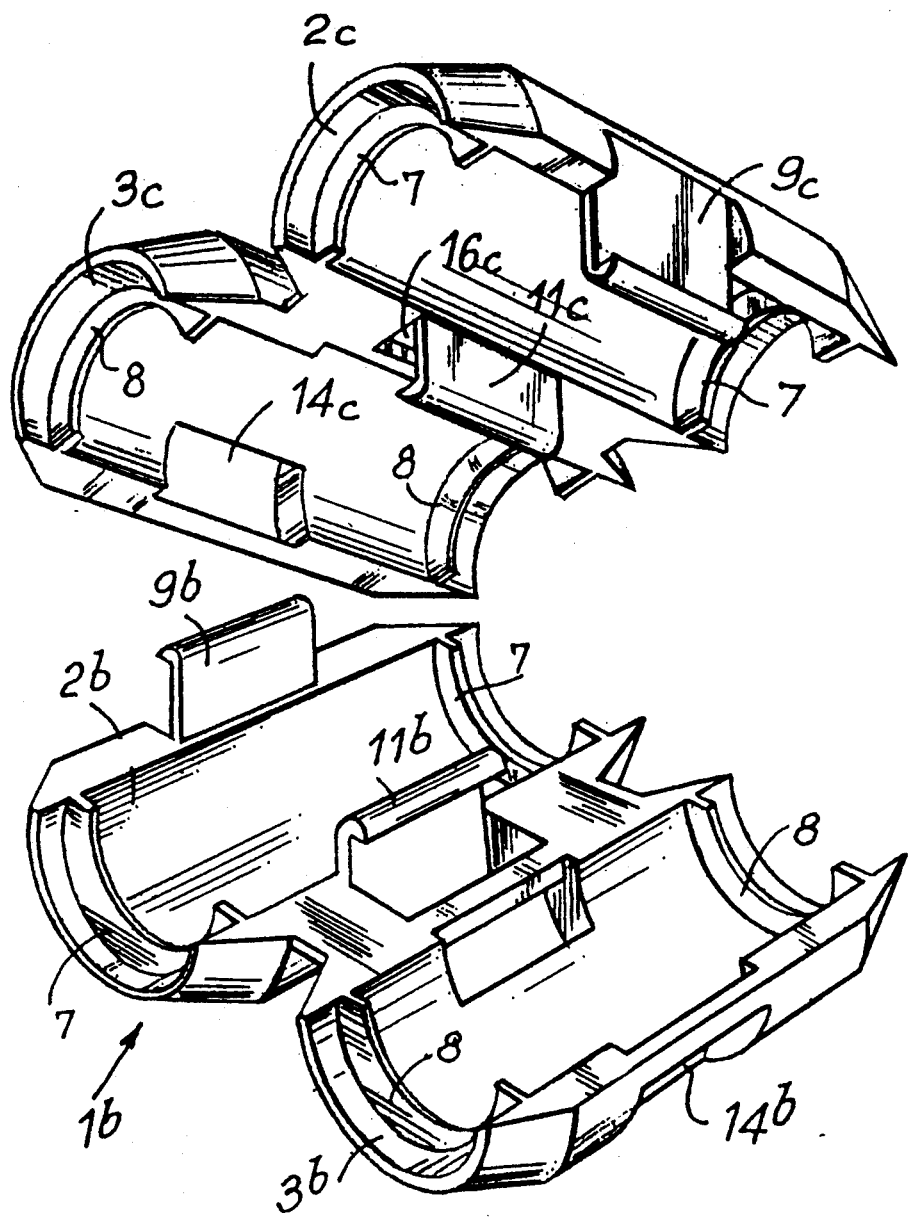
FIG. 5 is a perspective view showing the use of two closure rings with one ring turned upside down.

FIGS. 5 and 6 show the fitting together of two closure rings. In these figures the same reference numbers are used for one closure ring with the suffix "b" and for the other closure ring with the suffix "c".

As can be seen in FIGS. 5 and 6, the closure ring 1b is held open and the closure ring 1c is also open but upside down, so that the two closure rings 1b and 11c can be assembled together (see FIG. 6), the bars 9c and 11c being inserted in the openings 14b and 16b, respectively, and the bars 9b and 11b cooperating with the openings 14c and 16c, respectively.

Figure 7:
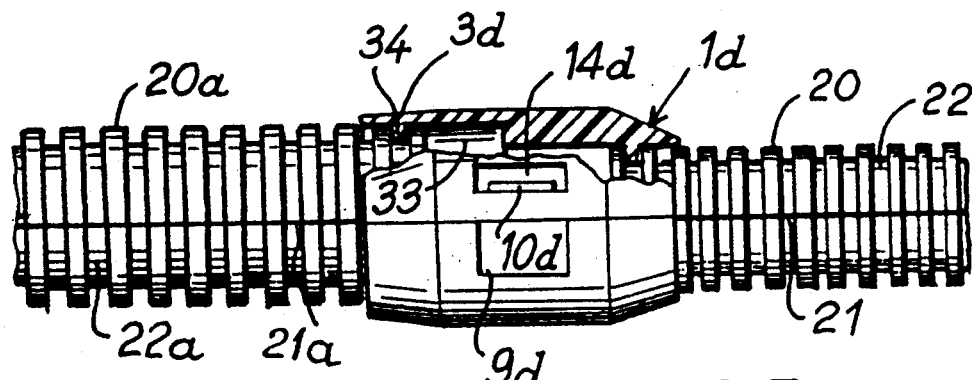
FIG. 7 is a partially cut-away elevation view of another embodiment of the closure ring in accordance with the invention.

FIG. 7 shows a further embodiment of the invention. The same reference numbers are used to identify parts corresponding to those in the other figures but with the suffix "d".

The FIG. 7 closure ring is designed for butt-jointing two conduits 20 and 20a. Both conduits are corrugated but the conduit 20a has a larger diameter than the conduit 20.

One end of the ring 1d has an internal channel 33 with a diameter corresponding to that of the conduit 20a with a rib 34 which is inserted into a groove 22a of the conduit 20a.

Figure 8:
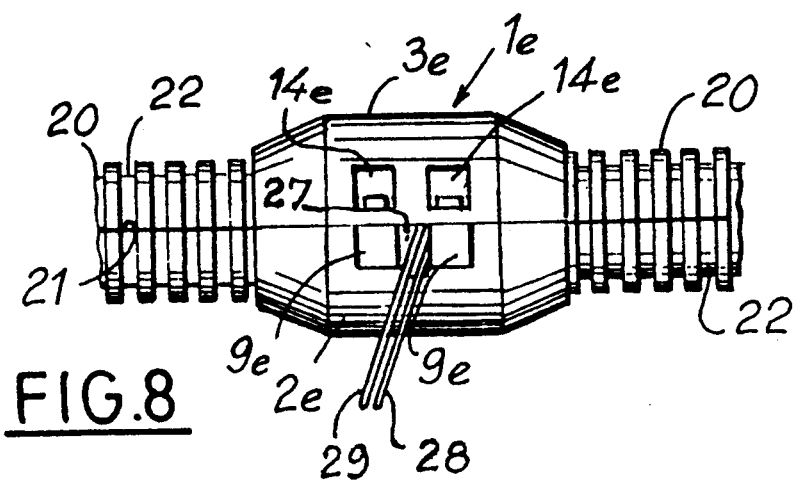
FIG. 8 is an elevation view of a further embodiment of the closure ring in accordance with the invention.

When two conduits 20 are butt-jointed using the closure ring in accordance with the invention it may be necessary to bring the electrical wires out laterally. FIG. 8 shows such an embodiment. In this figure the reference numbers designating parts corresponding to those in the other figures carry the suffix "e".

The part 2e of the closure ring 1e comprises two bars 9e and on its edge, between the two bars 9e, a cut-out 27 through which conductors 28 and 29, for example, can be passed when the closure ring is closed. The part 3e is provided with two openings 14e to receive the bars 9e.

Figure 9:
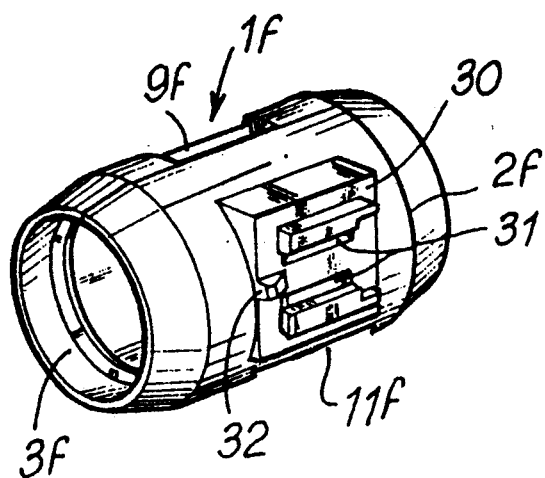
FIG. 9 is a perspective view of a still further embodiment.

FIG. 4 shows one way of fixing the closure ring in accordance with the invention to a wall. FIG. 9 shows a variant fixing means.

In this figure the same reference numbers are used to designate parts corresponding to the other figures but with the suffix "f".

The part 2f is molded with a flat part 30 carrying two projecting ribs 31 which constitute a slideway for a corresponding male member provided on a wall.

The flat part 30 is provided with a lug 32 which constitutes a stop member for the male member and which can be inserted into a hole in the male member to constitute a definitive coupling.

The invention is not limited to the embodiments shown that have just been described. Numerous detail modifications may be made thereto without departing from the scope of the invention.

What is claimed is:

1. A connector fitting for corrugated conduit comprising:
   complementary first and second parts together defining a cylindrical body molded in one piece;
   a strip forming a hinge which links said first and second parts;
   at least one rib on each of said first and second parts disposed in a plane perpendicular to the longitudinal axis of the part;
   a first locking member at a free end of said first part opposite that adjoining said strip forming a hinge, and a complementary second locking member at a free end of said second part opposite that adjoining said hinge;

a third locking member on an edge of said first part adjoining said hinge, and a complementary fourth locking member on an edge of said second part adjoining said hinge;

said first locking member comprising a first bar and an outwardly facing first hook at an end of said first bar, said third locking member comprising a second bar and an outwardly facing second hook at the end of said second bar, said second part comprises two openings in corresponding edges adapted to receive said first and second bars and having flats at their outer edges adapted to cooperate with said first and second hooks; and wherein one of said first and second parts includes means provided on the outer circumference for fixing to a male member.

2. Fitting according to claim 1, wherein the inside diameter of one end of the fitting is greater than the inside diameter of the other end.

3. A connector fitting for corrugated conduit comprising:

complementary first and second parts together defining a cylindrical body molded in one piece;

a strip forming a hinge which links said first and second parts;

at least one rib on each of said first and second parts disposed in a plane perpendicular to the longitudinal axis of the part;

a first locking member at a free end of said first part opposite that adjoining said strip forming a hinge, and a complementary second locking member at a free end of said second part opposite that adjoining said hinge;

a third locking member on an edge of said first part adjoining said hinge, and a complementary fourth locking member on an edge of said second part adjoining said hinge;

said first locking member comprising a first bar and an outwardly facing first hook at an end of said first bar, said third locking member comprising a second bar and an outwardly facing second hook at the end of said second bar, said second part comprises two openings in corresponding edges adapted to receive said first and second bars and having flats at their outer edges adapted to cooperate with said first and second hooks;

one of said first and second parts includes means provided on the outer circumference for fixing to a male member; and wherein said means includes a slideway for receiving the male member and incorporating a stop member.

4. A connector fitting for corrugated conduit comprising:

complementary first and second parts together defining a cylindrical body molded in one piece;

a strip forming a hinge which links said first and second parts;

at least one rib on each of said first and second parts disposed in a plane perpendicular to the longitudinal axis of the part;

a first locking member at a free end of said first part opposite that adjoining said strip forming a hinge, and a complementary second locking member at a free end of said second part opposite that adjoining said hinge;

a third locking member on an edge of said first part adjoining said hinge, and a complementary fourth locking member on an edge of said second part adjoining said hinge;

said first locking member comprising a first bar and an outwardly facing first hook at an end of said first bar, said third locking member comprising a second bar and an outwardly facing second hook at the end of said second bar, said second part comprises two openings in corresponding edges adapted to receive said first and second bars and having flats at their outer edges adapted to cooperate with said first and second hooks; and and one of said first and second parts includes a cut-out for passing electrical conductors therethrough.

5. Fitting according to claim 4, wherein said cut-out is formed in the free edge of one of said first and second parts.

* * * * *